United States Patent [19]

Marcillaud

[11] 4,040,674
[45] Aug. 9, 1977

[54] VEHICLE LOAD FORCE PROPORTIONING DEVICE

[75] Inventor: Roger Marcillaud, Clichy sous Bois, France

[73] Assignee: WABCO Westinghouse, Freinville-Sevran, France

[21] Appl. No.: 693,359

[22] Filed: June 7, 1976

[51] Int. Cl.² ............................................. B60T 8/22
[52] U.S. Cl. .................................................. 303/22 R
[58] Field of Search ....................... 137/505.16, 505.17; 303/22 A, 22 R, 23 A, 23 R

[56] References Cited

U.S. PATENT DOCUMENTS

| | | | |
|---|---|---|---|
| 3,749,452 | 7/1973 | Deschenes | 303/22 R |
| 3,809,110 | 5/1974 | Severinsson | 303/22 R |
| 3,874,746 | 4/1975 | Pollinger et al. | 303/22 R |

Primary Examiner—Duane A. Reger
Attorney, Agent, or Firm—R. S. Visk; R. W. McIntire, Jr.

[57] ABSTRACT

A vehicle load force proportioning device compressibly interposable between a sprung portion and an unsprung portion of a vehicle and subjectable to a compressive force of a degree corresponding to the vehicle load, the proportioning device including a pair of axially aligned force-translating piston members having respective pressure areas of different dimensions and having an elastomeric member disposed therebetween for transferring the vehicle load force from one of the piston members to the other and converting the vehicle load force to an operating force for causing a control valve device to emit a control impulse at a degree according to that of the operating force which, relative to the vehicle load force, is either proportionally reduced or amplified depending upon the respective dispositions of the different dimension piston members in the proportioning device relative to the sprung and unsprung portions of the vehicle.

9 Claims, 2 Drawing Figures

VEHICLE LOAD FORCE PROPORTIONING DEVICE

BACKGROUND OF THE INVENTION

In presently known load force proportioning devices of the type above described, the lateral cylindrical surfaces of the load force-translating piston members, especially that of the larger member, in some instances make direct frictional contact with the inner lateral cylindrical walls of the casing, therefore subjecting said surfaces to excessive wear. This undesirable condition, in some cases, has been corrected by making the piston member of smaller diameter than the cylinder to thereby provide annular radial space between the cylindrical surfaces with a non-metallic spacer ring carried by the piston member for guiding it during axial displacement thereof. In providing the annular a ial clearance between the piston member and the cylinder wall, however, extrusion of the elastomeric member into such radial clearance may occur when pressure is applied to the elastomeric member, and consequently damage thereto and undue wear thereof usually results.

SUMMARY OF THE INVENTION

The object of the present invention, therefore, is to provide an improved vehicle load force proportioning device, which includes an elastomeric member disposed between two force-translating piston members of different diameters, constructed in such manner as to provide radial clearance between the large piston member and the casing wall with means for reducing such clearance to a minimum adjacent the elastomeric member for preventing extrusion thereof into the clearance.

Briefly, the invention resides in a vehicle laod force proprotioning device including two force-translating piston members of different diametral dimensions having an elastomeric member interposed therebetween for transmitting the load force from one of the piston member to the other with a radial clearance provided between the cylindrical surface of the larger piston member and the inner cylindrical surface of the casing to prevent frictional contact and wear therebetween. A non-metallic spacer ring, which may be made of a polytetrafluoroethylene material, for example, and sold commercially under the trademark Teflon, is surroundingly carried by the larger piston member and makes sliding contact with the inner surface of the cylindrical casing wall for preventing contact thereof by said larger piston member which is thereby guided in the casing bore, the improvement comprising an annular member carried adjacent the outer periphery of the upper surface of said larger piston member between said upper surface and the elastomeric member, the diameter of said annular member being slightly larger than that of the larger piston member but smaller than the inner diameter of the cylinder wall so as to provide a reduced clearance (as compared to the clearance between the piston member itself and the cylinder wall) which is of such dimension as to prevent extrusion of the elastomeric member therebetween and at the same time eliminate frictional contact with said cylindrical wall. The annular member is provided with a locking rib engaging a complementary groove in the upper surface of the larger piston member and is also effective for sealing the elastomeric member (which may be hollow and filled with liquid, such as oil) against leakage of liquid therefrom.

DESCRIPTION AND OPERATION

Figure 1:
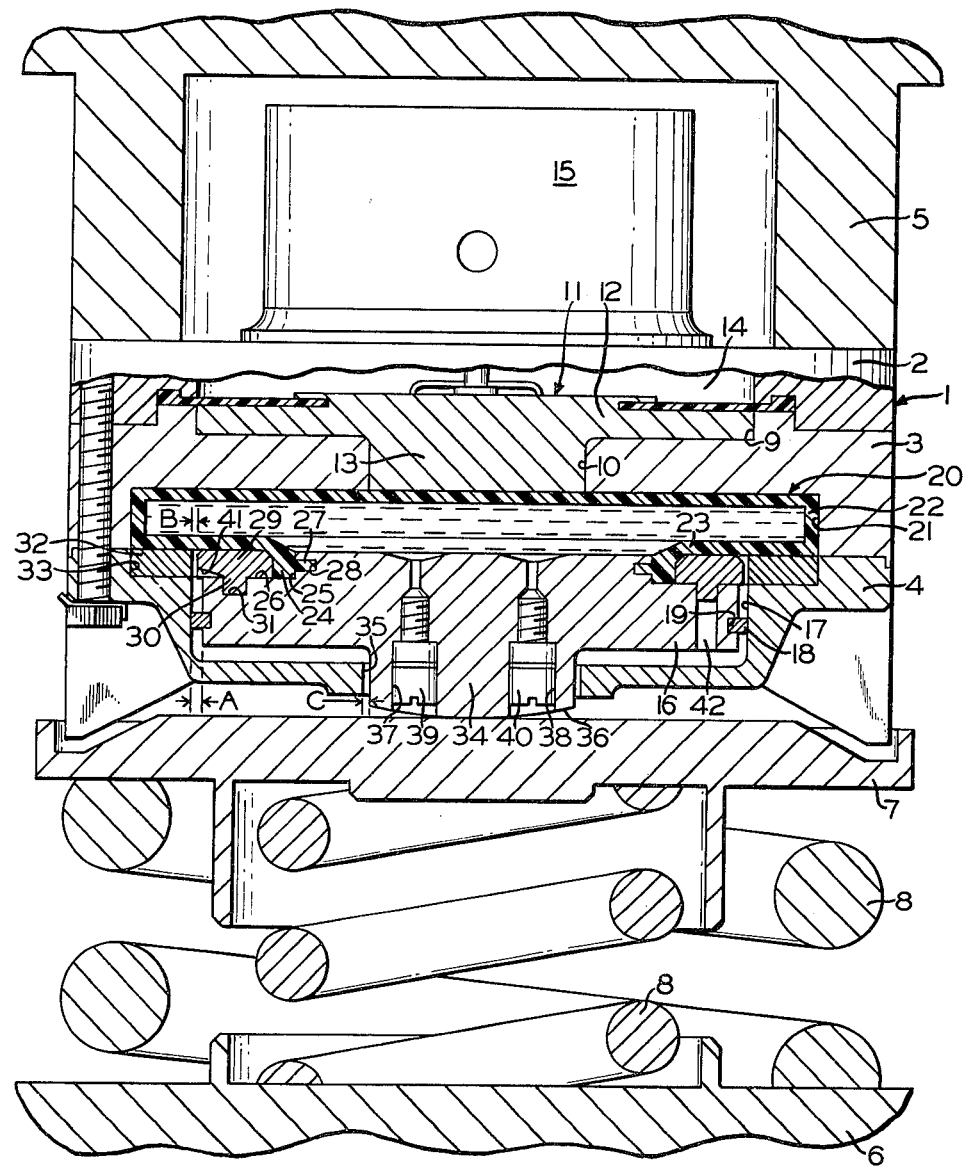
FIG. 1 is an elevational view, in section, of a load force proportioning device embodying the invention.

A vehicle load force proportioning device 1, as shown in FIG. 1, comprises a multiple section housing including an upper housing section 2, an intermediate housing section 3, and a lower housing section 4. The force proportioning device 1 is normally operable interposed between a sprung portion 5, such as the passenger compartment of a railway vehicle, and an unsprung portion 6, such as the frame of a wheel truck of the vehicle. Actually, the device 1 is interposed between sprung portion 5, which is in contact with upper housing section 2, and a bearing plate 7 resting on vehicle suspension springs 8 compressedly interposed between said bearing plate and the unsprung portion 6.

Intermediate housing section 3 is provided with a coaxial stepped bore including a large-diameter portion 9 above a smaller-diameter portion 10, in which stepped bore a small-diameter force-translating piston member 11 is reciprocably disposed, said piston member conforming in shape to said stepped bore so as to have a larger-diameter portion 12 disposed in larger bore portion 9 and a smaller-diameter portion 13 disposed in smaller bore portion 10. The upper or larger pressure area of piston member 11 is disposed adjacent to and is subject to pressure (such as pneumatic pressure) in a control pressure chamber 14 which pressure controls operation of a control valve device 15 supported by upper housing section 2.

Since the structural and operational details of the control valve device 15 are not deemed essential to an understanding of the invention, it will suffice to say that said control valve device operates for emitting a control impulse, at a degree determined by the prevailing pressure in chamber 14, to the brake apparatus (not shown) of the vehicle for effecting a brake application according to the degree of said impulse as determined by vehicle load, which will be more fully explained hereinafter.

A large-diameter (as compared to the diameter of piston member 11) force-translating piston member 16 is operably disposed in a coaxial bore 17 formed in lower housing section 4 in a axial alignment with small-diameter piston member 11. The large-diameter piston member 16 is somewhat smaller than the diameter of bore 15 to provide an annular radial clearance A therebetween.

A non-metallic spacer ring 18 is carried in an annular groove 19 formed in the cylindrical surface of large-diameter piston member 16 for guiding axial displacement of the piston member in bore 17 without undue radial play. Spacer ring 18 should possess such qualities as to be non-abrasive, wear-resistant, and self-lubricating, and therefore made of such material as polytetrafluoroethylene, for example, which is commercially sold under the trademark Teflon.

An elastomeric force-transfer member 20 is abuttingly sandwiched between piston members 11 and 16 in a counterbore 21 formed in intermediate housing section 3 and opening to the under side thereof. Transfer member 20, in this instance and as illustrated in FIG. 1, comprises a hollow flexible container or envelope 22 made to conform in shape to counterbore 21, and normally filled with a non-freezing liquid such as oil, for example, and therefore made of an oil resistant material such as neoprene. The lower side of transfer member 20 has formed therein a large concentric opening adjacent the upper area of piston member 16, said opening being peripherally surrounded by an annular radially inwardly extending anchoring and sealing portion 23.

The inner periphery of sealing portion 23 of transfer member 20 has integrally formed thereon a downward coaxially extending sealing rim 24 snugly fitting in the juncture of a vertical wall portion 25 and a horizontal surface of peripheral shoulder 26 formed on the upper side of piston member 16. Sealing rim 24 has formed thereon an annular internal bead 27 adapted to sealingly fit in an annular groove 28 cut in the vertical wall 25.

According to the invention, a securing ring 29, which, for purposes of assembly, may be in the form of two semicircular matching portions, is disposed between the underside of transfer member 20 and shoulder 26, the inner diameter of said ring being such as to make sealing contact with sealing rim 24. The underside of securing ring 29 is provided with an annular coaxially extending rib 30 designed to fit in an annular groove 31 formed in the horizontal surface of shoulder 26 for preventing radial displacement of said securing ring. Securing ring 29 also serves to support that portion of the underside area of transfer member 20 making contact therewith, said securing ring, as in the case of spacer ring 18, may also be made of Teflon, above defined, to reduce frictional wear between said securing ring and the transfer member.

A support ring 32, also of Teflon, above defined, conforms in shape to and is disposed in a counterbore 33 formed in lower housing section 4 on the upper side adjacent transfer member 20 for supporting the remaining area of the underside of said transfer member not supported by securing ring 29. The inner diameter of counterbore 33 coincides with the diameter of bore 17 formed in lower housing section 4 whereas the outer diameter of said counterbore coincides with that of counterbore 21 formed in intermediate housing section 3.

The outer diameter of securing ring 29 is larger than the diameter of piston member 16 but smaller than the inner diameter of support ring 32, so as to provide a radial clearance B therebetween, said clearance B being less than, or approximately half of clearance A, and, therefore, sufficient for preventing interference in relative movement between the support ring and the securing ring and small enough to prevent extrusion of flexible envelope 22 therebetween.

The larger force-translating piston member 16 is provided with a smaller-diameter portion 34 extending coaxially from the underside of said piston member through an opening 35 formed on the underside of lower housing section 4 with a radial clearance C provided between said smaller-diameter portion and said opening, said clearance C being smaller than clearance A. Portion 34, which makes bearing contact with bearing plate 7, is provided with a rounded convex bottom surface 36 for accommodating possible slight axial rocking motiion of said bearing plate. Also provided in smaller-diameter portion 34 of piston member 16 is a pair of openings 37 and 38 with respective plugs 39 and 40, via which openings liquid may be supplied to or evacuated from envelope 22.

When the load force proportioning device 1 is in operation, suspension springs 8, in reaction to the vehicle load acting thereon, exert an upwardly directed force on bearing plate 7, which, in turn, transmits such force, through portion 34, to the larger force-translating piston member 16. The total force acting on piston member 16 is transmitted to and distributed generally over the lower area of flexible transfer member 20. Since transfer member 20 is liquid-filled, the force transmitted thereto from piston member 16 is uniformly distributed thereby, so that the amount of force transferred to the smaller-diameter piston member 11 is a reduced force equivalent to the ratio of the pressure area of portion 13 of said smaller piston member to that of the larger piston member. The reduced force transferred to piston member 11 is, in turn, transmitted therethrough to act on the pneumatic pressure in control chamber 14 for influencing said pneumatic pressure accordingly in establishing the degeee of control impulse emitted by valve device 15.

It should be obvious, that if the relative dimensions of piston members 11 and 16, were reversed, that is, if piston member 11 were larger than piston member 16, the load force translated by the proportioning device 1 would be amplified rather than reduced.

During operation of the proportioning device 1, and as hereinbefore noted, the rounded bottom surface 36 of portion 34 of piston member 16 minimizes any tendency of said piston member to be subjected to cocking action which could be caused by rocking action of bearing plate 7 during axial movement thereof. Moreover, should any such lateral movement of piston member 16 actually occur, clearance C between portion 34 and opening 35 will accommodate such lateral movement.

During axial displacement of piston member 16, spacer ring 18 provides guidance for such displacement and, in that said spacer ring is of a self-lubricating, non-metallic material, wear of cylinder wall 17 is negligible. Moreover, clearance A, along with the relatively small contact area between spacer ring 18 and cylindrical wall 17, will accommodate any contingent lateral movement or rocking of piston member 16, as above discussed.

The force acting upwardly on piston member 16 is transmitted directly to the liquid in envelope 22 and also to securing ring 29. Thus, the force exerted on securing ring 29 causes said ring to be pressed against sealing rim 24 of transfer member 20 for providing an effective sealing relation therebetween and between bead 27 and groove 28, thereby preventing leakage of liquid from envelope 22.

Notwithstanding the internal pressure acting on the inner surface of envelope 22 due to pressurized liquid therein, the relatively small clearance B between the adjacent lateral surfaces of support ring 32 and securing ring 29 prevents appreciable or damaging extrusion of said envelope into said space. The non-abrasive, self-lubricating qualities of securing ring 29 and support ring 32 also minimize wear of envelope 22 as it is stretched and rubbed against said rings during axial movement of piston member 16.

If it becomes necessary to replace securing ring 29, which, as above noted, may comprise two semi-circular sections, removal of the ring from its installed position may be facilitated by providing notches, such as at 41, on the lower surface of said ring sections into which a screw driver may be inserted for prying the ring loose from groove 31, or removal of securing ring 29 may be facilitated by pushing a pin up through holes 42, one of which is shown, drilled axially into piston member 16 to intersect groove 31 and rib 30.

Figure 2:
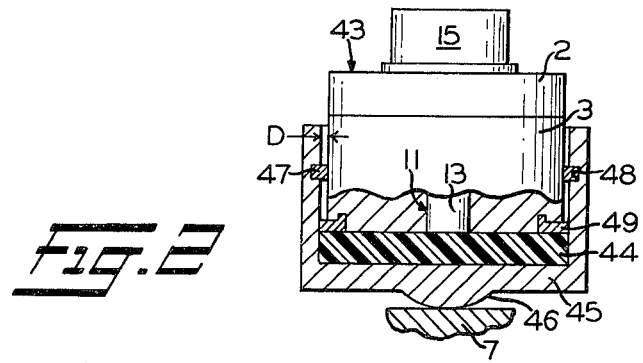
FIG. 2 is a partially sectionalized view, on a smaller scale, of a modified embodoment of the load force proportioning device shown in FIG. 1.

A modified load force proportioning device 43, as shown in FIG. 2, also includes upper housing section 2, on which the control valve device 15 is mounted, intermediate housing section 3, and the smaller-diameter force-translating piston member 11 of which the smaller-diameter portion 13 may be seen in FIG. 2, said smaller-diameter portion being somewhat axially longer than portion 13 of the device 1 shown in FIG. 1.

Device 43 is provided with a resilient transfer member 44, which, in this case, is a solid member made of such material as a suitable rubber, for example, instead of the liquid-filled member 20 shown in FIG. 1. A cuplike larger-diameter force translating piston member 45, also provided with a convex rounded bottom surface 46, rests on bearing plate 7, only a portion of which is shown in FIG. 2. The hollow cylindrical portion of piston member 45 is of such axial length as to extend over and concentrically surround housing section 3 with a radial clearance D therebetween. Transfer member 44 is rested in the bottom of larger-diameter piston member 45 between said larger-diameter piston member and portion 13 of smaller-diameter piston member 11.

A spacer ring 47 is mounted in an internal groove 48 formed in the inner cylindrical wall of piston member 45 so as to be interposed between said cylindrical wall and the outer cylindrical surface of housing section 3. Spacer ring 47, which similarly to spacer ring 18 is made of Teflon (above defined), serves to guide piston member 45 during axial displacement thereof and to keep said piston member out of contact with the outer cylindrical surface of housing section 3.

A protective ring 49, also of Teflon, is peripherally secured at the bottom of housing section 3 between said housing section and transfer member 44, the outer diameter of said ring coinciding with the inner diameter of piston member 45 to thereby prevent extrusion of said transfer member into clearance D when pressure is applied to said transfer member by said piston member.

The proportioning device 43 operates in a manner similar to that of proportioning device 1, that is, a force applied on piston member 45 by bearing plate 7 is transferred therefrom by transfer member 44 to portion 13 of piston member 11 and thereby translated into a reduced force due to the smaller pressure area of said portion 13 relative to the pressure area of piston member 45. During axial displacement of piston member 45 and transfer member 44, said transfer member is protected by protective ring 49 from extrusion into clearance D and possible resulting damage therefrom.

Also, as in the case of the arrangement of the spacer ring 18 in proportioning device 1, spacer ring 47 prevents abrasive wear between the inner cylindrical surface of piston member 45 and the outer cylindrical surface of housing section 3, and allows for dissipation of any rocking action of piston member 45 inflicted thereon by bearing plate 7.

Having now described the invention what I claim as new and desire to secure by Letters Patent, is:

1. A vehicle load force proportioning device for translating the load force into an operating force for a vehicle brake control device, said force proportioning device comprising:
   a. a housing;
   b. first piston means reciprocably operable in said housing with a first radial clearance therebetween and on which the vehicle load force is applied;
   c. second piston means reciprocably operable in said housing in axial alignment with and having an effective pressure area of different dimension than said first piston means;
   d. a resilient transfer member sandwiched between and having opposite sides thereof in abutting contact with respective adjacent pressure areas of said first and second piston means for transferring said vehicle load force from said first piston means to said second piston means and either reducing or amplifying said load force according to the relative dimensions of said pressure areas; and
   e. a securing ring concentrically and peripherally carried by said first piston means adjacent said transfer member, said securing ring being of such diametrical dimension as to form a second radial clearance adjacent the resilient transfer member smaller than said first radial clearance for inhibiting extrusion of the transfer member into said second radial clearance.

2. A vehicle load force proportioning device, as set forth in claim 1, wherein said first piston means comprises a piston member of smaller diameter than the inner diameter of said housing for providing said first radial clearance therebetween, and a spacer ring carried by and surrounding said piston member for maintaining said first radial clearance during reciprocal movement of the piston member.

3. A vehicle load force proportioning device, as set forth in claim 2, wherein said securing ring and said spacer ring are of a non-metallic, self-lubricating material.

4. A vehicle load force proportioning device, as set forth in claim 1, wherein said securing ring is carried on a peripheral shoulder formed on said first piston means and is provided with an annular rib extending coaxially therefrom into a concentric annular groove formed in a horizontal surface perpendicular to the axis of said shoulder for inhibiting lateral displacement of the securing ring relative to said first piston means.

5. A vehicle load force proportioning device, as set forth in claim 4, wherein said securing ring comprises two matching semi-circular portions.

6. A vehicle load force proportioning device, as set forth in claim 4, wherein said resilient transfer member comprises a liquid-filled resilient envelope.

7. A vehicle load force proportioning device, as set forth in claim 6, wherein said resilient envelope is provided with a circular opening adjacent the pressure area of said first piston means and through which liquid may be supplied to and removed from the envelope, which envelope has integrally formed thereon, in surrounding relation to said opening, a sealing rim disposed between said securing ring and a vertical wall of said shoulder, said sealing rim being effective, when subjected to pressure exerted thereon by said securing ring from the force acting on said first piston means, for sealing said opening and the envelope against leakage of liquid therefrom.

8. A vehicle load force proportioning device, as set forth in claim 4, further characterized by a support ring disposed on an internal shoulder formed in said housing radially opposite to the shoulder formed on said first piston means for supporting the outer peripheral portion of said resilient transfer member, the inner diameter of said support ring being smaller than the outer diameter of said sealing ring for forming said second reduced radial clearance therebetween.

9. A vehicle load force proportioning device, as set forth in claim 8, wherein said support ring comprises a non-metallic, self-lubricating material for minimizing wear of the resilient transfer member during distortion thereof when subjected to pressure by said first piston means.

* * * * *